Nov. 25, 1924.
W. H. THOMPSON
1,517,131
DEVICE FOR CATCHING FLIES AND OTHER INSECTS
Filed June 29, 1923
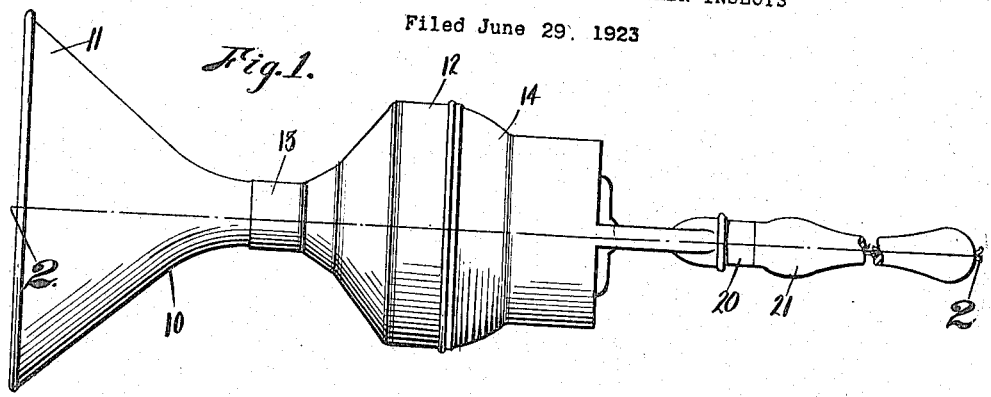
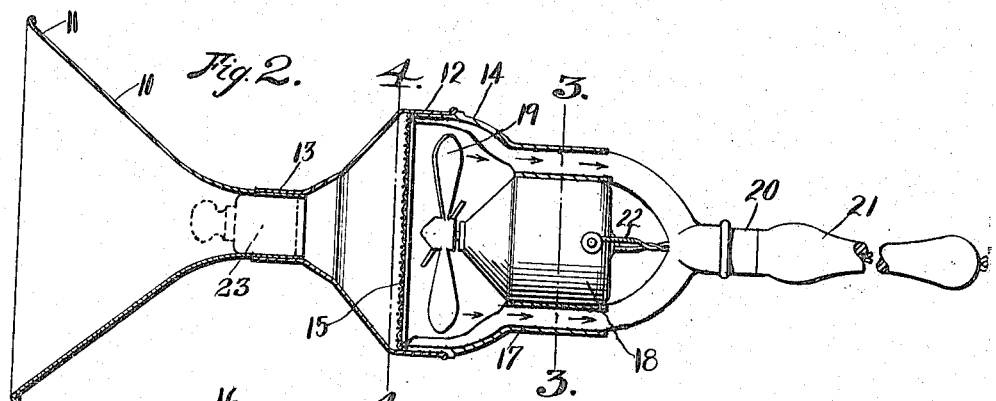
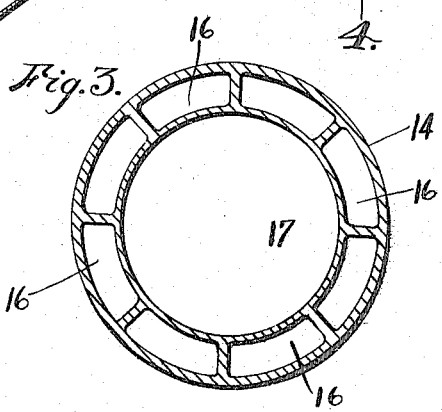
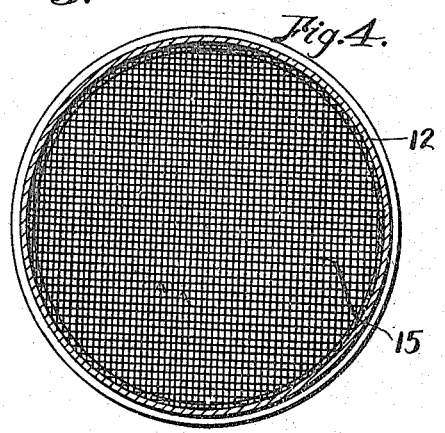
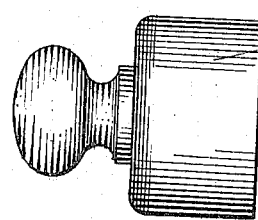
William H. Thompson
INVENTOR.
BY Victor J. Evans,
ATTORNEY.
WITNESS: J. B. White Patented Nov. 25, 1924.

1,517,131

UNITED STATES PATENT OFFICE.

WILLIAM H. THOMPSON, OF CARTHAGE, NEW YORK.

DEVICE FOR CATCHING FLIES AND OTHER INSECTS.

Application filed June 29, 1923. Serial No. 648,568.

*To all whom it may concern:*

Be it known that I, WILLIAM H. THOMPSON, a citizen of United States, residing at Carthage, in the county of Jefferson and State of New York, have invented new and useful Improvements in Devices for Catching Flies and Other Insects, of which the following is a specification.

This invention relates to a device for catching flies and other insects.

The principal object of the invention is the provision of a fly catching device wherein flies or other insects are drawn into the same and against a screen by means of a suction of vacuum and trapped therein.

Another object of the invention is the provision of a device of the character mentioned which is portable for permitting the same to be moved adjacent an insect whether in flight or at rest.

A still further object is to provide a fly catcher which is extremely simple in construction and operation, cheap of manufacture and highly efficient for the purpose intended.

With these and other objects in view, the invention resides in certain novel construction and combination and arrangement of parts, the essential features of which are hereinafter fully described, are particularly pointed out in the appended claims, are illustrated in the accompanying drawing, in which:—

Figure 1 is a plan view of the invention.

Figure 2 is a longitudinal sectional view therethrough on the line 2—2 of Figure 1.

Figure 3 is a transverse sectional view on the line 3—3 of Figure 2.

Figure 4 is a similar view on the line 4—4 of Figure 2.

Figure 5 is a detail view of the plug.

Referring more particularly to the drawing, the reference numeral 10 designates a funnel member having flared ends 11 and 12 and a restricted portion 13 intermediate the flared ends. The member 10 is open throughout its length and as shown in the drawings is made of two sections connected together at the restricted portion, but is to be understood that the same may be stamped from a single piece of material if desired. The flared end 11 is larger in diameter than the flared end 12 and serves as a mouth, while the flared end 12 is adapted to telescope over one end of a casting 14. Carried at the end 12 of the member 10 is a screen 15 against which the flies and other insects are to be drawn. The housing 14 is formed with a plurality of radial conduits 16 through which a current of air is adapted to pass, and furthermore the casting is provided with a bore 17 into which is inserted an electric motor 18 for sealing the bore and for revolving a fan 19 mounted upon the shaft of the motor. The housing also includes a socket 20 for the reception of a handle 21 through which are passed the usual wires 22, one end of which has connection with the motor 18, the other ends of the wires 22 may have secured thereto a suitable plug for connecting the same with a source of supply.

In operation, the handle 21 is grasped in the hand and the current turned on to start the motor, thereby revolving the fan 19. As the fan revolves, a suction or vacuum is created through the member 10 and conduit 16 as clearly illustrated by the arrows in Figure 2 of the drawing, and any fly or insect within range of the suction will be drawn through the member 10 and against the screen 15 where the same is held so long as the fan is in operation. When a sufficient number of flies have been drawn against the screen, a plug 23 is inserted in the restricted portion 13 for closing the same, after which the motor is turned off. The flies are now trapped in the flared end 12 by means of the screen 15 at one end, and the plug 23 at the other end. It is now desired to dispose of the trapped flies and the same is accomplished by detaching the member 10 from the housing 14, releasing the same by withdrawing the plug 23 from the restricted portion 13.

It will be seen that by providing the device with the handle and constructing the same of light material, there is provided a device which may be easily operated for trapping flies in various rooms of a dwelling or if desired the same may be made stationary for use in a particular place such as butcher shops and grocery stores.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In a device of the class described, the combination of a member having flared open ends and a restricted portion intermediate the flared ends, a screen mounted in one of said flared ends, and means mounted behind said screen for creating a vacuum through said member for drawing insects against said screen, and a removable plug for insertion in the restricted portion of said member for trapping the insects therein.

2. In a device of the class described, the combination of a member having flared open ends and a restricted portion intermediate the flared ends, a screen mounted in one of said flared ends, and means mounted behind said screen for creating a vacuum through said member for drawing insects against said screen, and a removable plug for insertion in the restricted portion of said member for trapping the insects therein, said means comprising a casting, a bore axially in said housing for the reception of an electric fan and a plurality of conduits encircling said bore.

3. A portable fly catcher comprising a housing, a bore formed in said housing axially thereof, a plurality of conduits encircling said bore, an electric motor adapted to seal said bore, a fan rotatable by said motor, a member open and flared at both ends and having a restricted portion intermediate the flared ends, one of said flared ends supporting a screen and adapted to have telescopic engagement with said housing whereby the operation of said fan will cause a vacuum through said member and conduits for drawing insects against said screen.

4. A portable fly catcher comprising a housing, a bore formed in said housing axially thereof, a plurality of conduits encircling said bore, an electric motor adapted to seal said bore, a fan rotatable by said motor, a member open and flared at both ends and having a restricted portion intermediate the flared ends, one of said flared ends supporting a screen and adapted to have telescopic engagement with said housing whereby the operation of said fan will cause a vacuum through said member and conduits for drawing insects against said screen, and a plug insertible in the restricted portion of said member for trapping the insects therein after the vacuum has been cut-off.

5. A portable fly catcher comprising a housing, a bore formed in said housing axially thereof, a plurality of conduits encircling said bore, an electric motor adapted to seal said bore, a fan rotatable by said motor, a member open and flared at both ends and having a restricted portion intermediate the flared ends, one of said flared ends supporting a screen and adapted to have telescopic engagement with said housing whereby the operation of said fan will cause a vacuum through said member and conduits for drawing insects against said screen, and a plug insertible in the restricted portion of said member and for trapping the insects therein after the vacuum has been cut-off and a handle formed on said housing.

In testimony whereof I have affixed my signature.

WILLIAM H. THOMPSON.